Aug. 10, 1926.  
F. HUBER  
1,595,551  
CORN SHOCK TIGHTENING AND HOLDING MEANS  
Filed Jan. 23, 1926
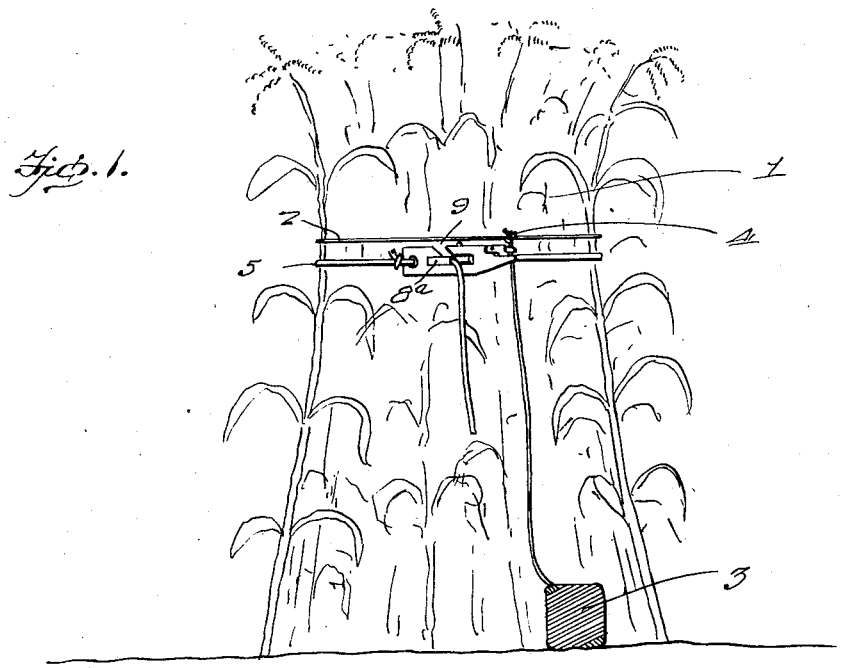
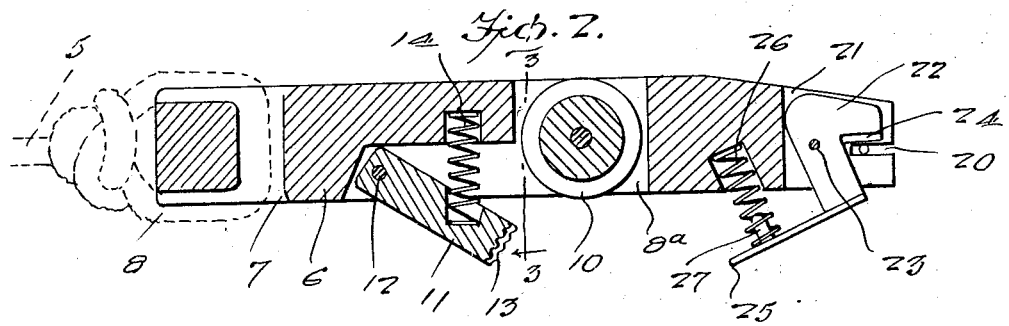
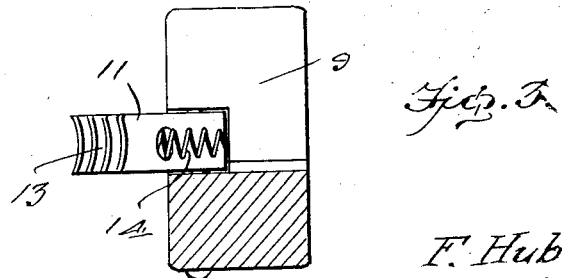
Inventor  
F. Huber  
By Clarence A. O'Brien  
Attorney Patented Aug. 10, 1926.

1,595,551

UNITED STATES PATENT OFFICE.

FERDINAND HUBER, OF COCHRANE, WISCONSIN.

CORN-SHOCK TIGHTENING AND HOLDING MEANS.

Application filed January 23, 1926. Serial No. 83,273.

My present invention has to do with the binding of corn shocks and the like; and it contemplates the provision of simple and easily manipulated means whereby a corn shock or the like may be tightened and held in compact form with a view to facilitating the binding of the shock through the medium of binding twine or any other appropriate means.

To the attainment of the foregoing, the invention consists in the improvement as hereinafter described and definitely claimed.

In the accompanying drawings, forming part of this specification:—

Figure 1 is a view illustrative of the manner in which the means constituting the preferred embodiment of my invention is employed.

Figure 2 is a horizontal section, on an enlarged scale, illustrating the fastener comprised in my improvement.

Figure 3 is an enlarged transverse section taken in the plane indicated by the line 3—3 of Figure 2, looking toward the left.

Similar numerals of reference designate corresponding parts in all of the views of the drawings.

I show in Figure 1 a corn shock 2, and I also show in said figure my novel shock tightening and holding means in use, and I further show binding twine designated by 2 positioned and applied for the binding of the shock, the said binding twine 2 being illustrated as in connection with a ball of twine designated by 3 and as being tied at 4 and in readiness to be cut by the cutting means of my improvement as hereinafter explicitly described.

My novel shock tightening and holding means is made up of a cable 5 and a fastener body 6, the said fastener body 6 being of wood or other appropriate material and being apertured at 7 adjacent to one of its ends for the permanent connection of the body 6 to the end of the cable 5 which may be of rope or other appropriate material, as designated by 8.

The fastener body 6 is provided with an opening 8ª and in communication with said opening 8ª is a mouth 9. In the opening 8ª and at one side of the mouth 9 is located a circumferentially grooved anti-friction roller or wheel 10, and arranged in said opening 8ª and connected at the opposite side of the opening 9 is a dog 11, said dog being pivoted to the body 6 at the point 12 and being provided with teeth 13 on its free end, and being subject to the action of an expansion spring 14 disposed in opposite seats 15 in the body 6 and dog 11, respectively.

My improved shock tightening and holding means is applied to the shock precedent to the binding of the shock through the medium of the binding twine 2, with this understanding, the mode of using my novel means will be fully appreciated when it is stated that the operator grasping the rope 5 throws the fastener 6 with his right hand around the shock, and catches the fastener 6 with his left hand, and then while holding the fastener 6, the operator introduces the end portion of the rope 5 through the mouth 9 and into the opening 8ª and in contact with the perimeter of the wheel 10, and then the operator pulls on the free end of the rope 5 until said rope is sufficiently taut about the shock 1, whereupon the dog 11 is swung inwardly against the action of the spring 14 and so as to securely clamp and hold the rope 5 in its taut state. In this connection it will be understood that the greater the pull on the rope 5, the more securely will the dog 11 grip the rope, and hence there is no liability of the rope 5 becoming casually loose. After the tightening of the shock and while the shock is held in a compact state, the binding twine 2 is applied about the shock and is tied as before described and as designated by 4, and then the binder twine is cut to leave a band on and about the shock 1.

For the convenient cutting of the binder twine 2, while my novel means is still applied to the shock, the body 6 of the fastener is kerfed at one end as designated by 20 for the reception of the binder twine, and in a bifurcated portion 21 at the end of the fastener body 6 a knife 22 is pivotally mounted at the point 23, the cutting edge of the said knife being designated by 24, and the knife being provided with an arm 25 between which and the body 6 is interposed a spring 26, said spring being held adequately in working position through the medium of a stud 27 on the inner side of the arm 25. It will be readily understood from the foregoing that the knife is maintained in such position as not to interfere in any measure with the introduction of the binder twine in the kerf 20; and it will also be understood that when the arm 25 is moved toward the body 6, the twine will be severed. The arm 25 may be moved as stated by the direct application of the hand thereto, or, if preferred, a hammer blow may be imposed on the arm 25 to rock the knife and bring about the cutting of the binder twine.

Subsequently to the proper binding of the shock in the manner and through the medium of the means described, my novel tightening and holding means may be quickly and easily removed from the shock after disengagement of the dog 11 from the rope 5, and it will also be readily appreciated that my novel tightening and holding means may be conveniently carried from shock to shock as the work of shocking progresses in a field.

Notwithstanding the practical advantages ascribed to my novel shock tightening and holding means, it will be noted that the said means is simple and inexpensive in construction and is therefore adapted to be made and sold with profit for a small price.

Manifestly my novel shock tightening and holding means is adapted to be used with facility and is calculated to lessen the labor of farm hand to a very material extent.

I have specifically described the preferred embodiment of my invention in all of its details in order to impart a full, clear and exact understanding of the said embodiment. I do not desire, however, to be understood as confining myself to the precise construction and relative arrangement of parts as disclosed, my invention being defined by my appended claim within the scope of which changes in structure and in arrangement may be made without departure from my invention.

Having described my invention, what I claim and desire to secure by Letters-Patent, is:—

Means for tightening and holding corn shocks and the like, comprising a cable, a fastener body connected with one end of the cable and having an opening and also having a mouth in communication with said opening to facilitate the lateral introduction of the free end portion of the cable into the opening, an anti-friction wheel mounted in the opening and located at one side of said mouth, and a dog pivoted in the opening and arranged at the opposite side of said mouth and having teeth at its free end and also having a recess to seat one end of its spring interposed between it and the body.

In testimony whereof I affix my signature.

FERDINAND HUBER.